June 6, 1961   R. L. UNDERBERG ET AL   2,986,830
COLLAPSIBLE CARDBOARD SLIDE VIEWER
Filed June 26, 1959   2 Sheets-Sheet 1
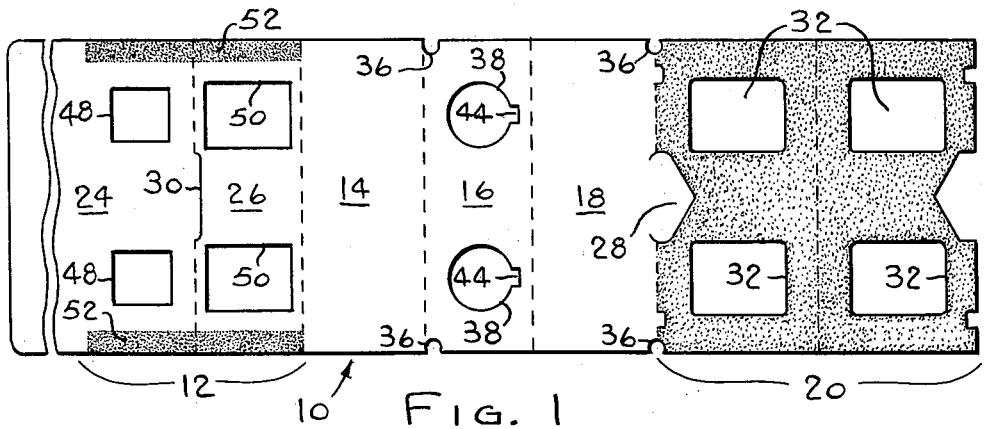
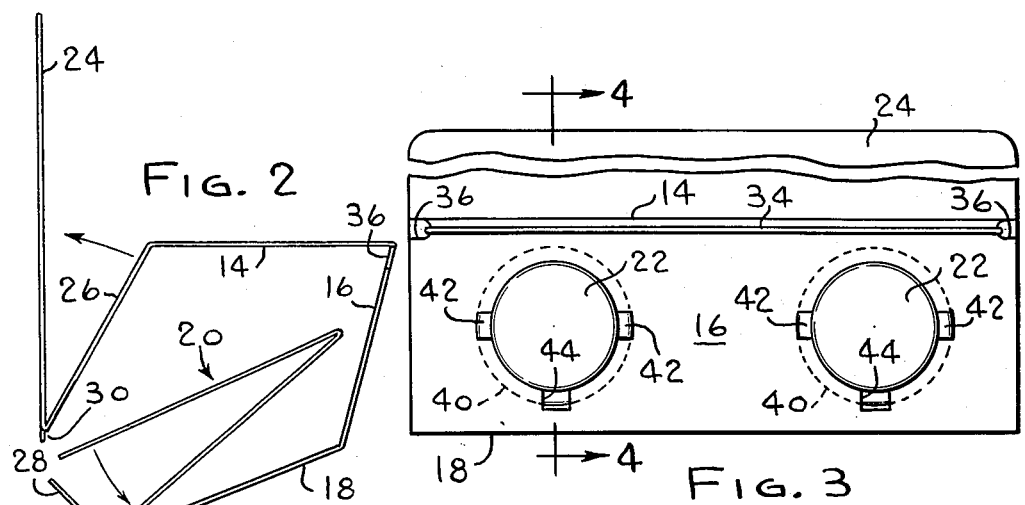
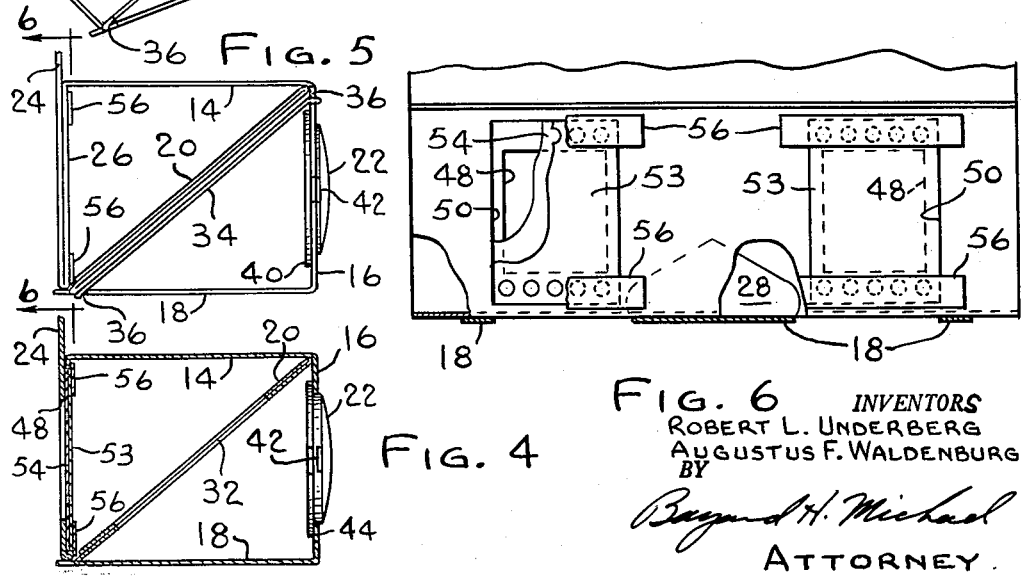
INVENTORS
ROBERT L. UNDERBERG
AUGUSTUS F. WALDENBURG
BY
Bayard H. Michael
ATTORNEY.

June 6, 1961   R. L. UNDERBERG ET AL   2,986,830
COLLAPSIBLE CARDBOARD SLIDE VIEWER
Filed June 26, 1959   2 Sheets-Sheet 2
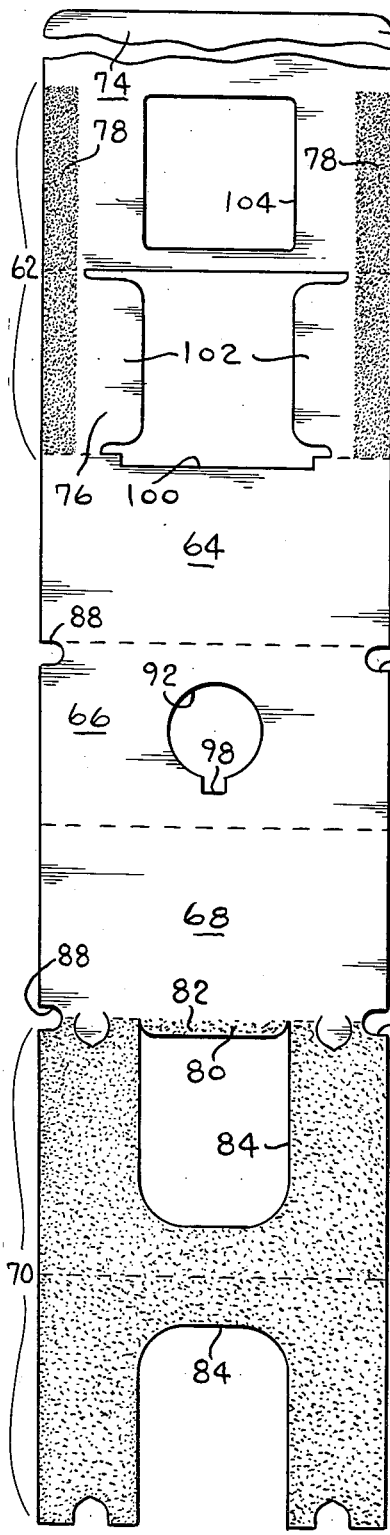
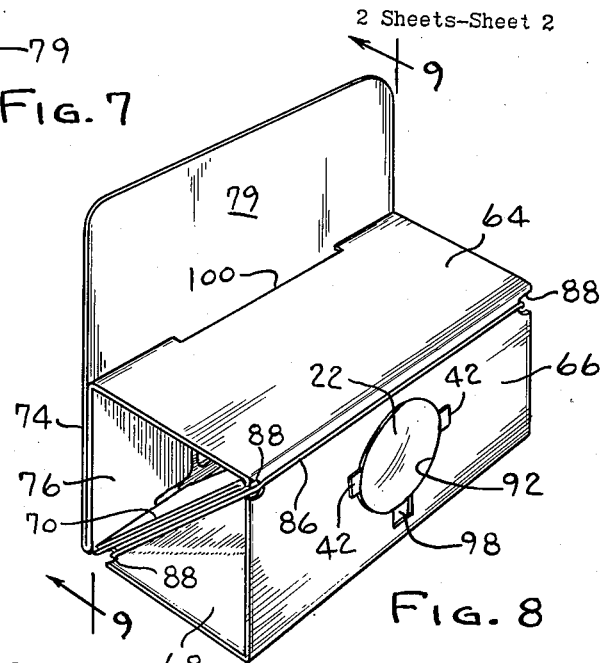
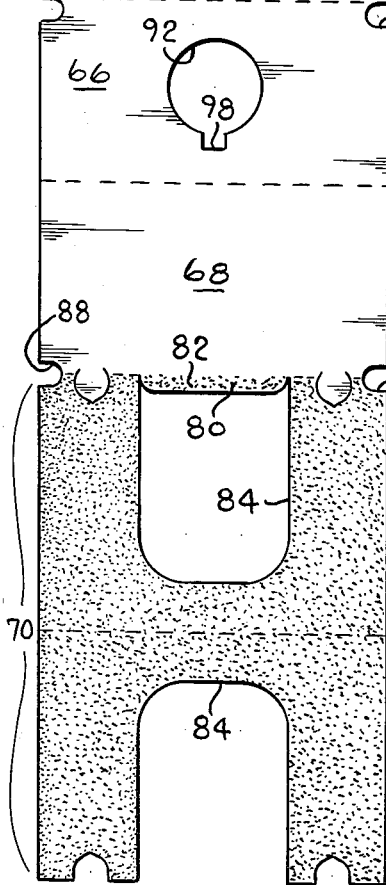
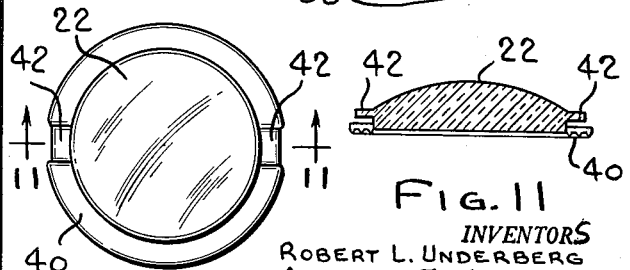
INVENTORS
ROBERT L. UNDERBERG
AUGUSTUS F. WALDENBURG
BY
Bayard H. Michael
ATTORNEY

United States Patent Office 2,986,830
Patented June 6, 1961

2,986,830
COLLAPSIBLE CARDBOARD SLIDE VIEWER
Robert L. Underberg and Augustus F. Waldenburg, Milwaukee, Wis., assignors, by mesne assignments, to Realist, Inc., Menomonee Falls, Wis., a corporation of Delaware
Filed June 26, 1959, Ser. No. 823,045
5 Claims. (Cl. 40—63)

This invention relates to a self-erecting slide viewer that can be collapsed for storage or mailing and will automatically open to a viewing position when released.

The primary object of this invention is to provide a low cost slide viewer which is collapsible for mailing or other purposes and which will be self-erecting when taken from the envelope or storage box.

This is an inexpensive cardboard slide viewer in which slide transparencies in the form of a single slide or a stereo pair can be mounted for satisfactory viewing through a lens mounted in the cardboard assembly. The entire assembly can be collapsed to a flat condition for mailing, for example, and is self-erecting to the viewing position. The device has obvious application for the advertising and souvenir markets.

Other objects and advantages will be pointed out in or be apparent from the specifications and claims, as will obvious modifications of the same embodiment shown in the drawings, in which:

FIGURE 1 shows the viewer as a single blank.
FIGURE 2 shows the viewer partly opened.
FIGURE 3 is a front elevation of the viewer.
FIGURE 4 is taken on line 4—4 of FIGURE 3.
FIGURE 5 is a side elevation of the viewer.
FIGURE 6 is taken on line 6—6 of FIGURE 5.
FIGURE 7 is a modified form of the viewer.
FIGURE 8 is a projection of the modified form of the viewer.
FIGURE 9 is taken on line 9—9 of FIGURE 8.
FIGURE 10 shows a view of the lens.
FIGURE 11 is taken on line 11—11 of FIGURE 10.

Die cut blank 10 has slide mount portion 12, top panel 14, front panel 16, bottom panel 18, and a diagonal brace portion 20 extending from the intersection of the slide mount section and the bottom panel to the intersection of the top and front panels. The diagonal is suitably apertured to allow viewing through a pair of lenses 22 mounted in the front panel to obtain a proper stereo view of the transparencies mounted in the slide mount.

More specifically, the blank is scored for folding as shown in FIGURE 1 where back panel 26 is folded against rear wall 24 to sandwich therebetween the stereo pair in a mount to be described later. The rear wall 24 projects above the back panel 26 providing a space to print advertising material, greetings, or the like. The top panel projects forwardly as shown in a plane transverse to the plane of the slide mount. The front panel folds downward in a plane that is parallel to the plane of the slide mount. The bottom panel folds back to a position normal to the slide mount and a tab 28 is inserted through slot 30 between the rear wall 24 and the back panel 26. In this position the double thickness diagonal brace will extend from the back edge of the bottom panel to the top edge of the front panel as seen in FIGURES 4 and 5. The diagonal is provided with a self-adhesive to make a rigid double thickness brace when folded on itself. It is provided with a pair of apertures 32 aligned with the viewing axes to present an unobstructed view of the picture. A rubber band 34 is mounted on the viewer coplanar with the brace in notches 36 to bias the viewer into the viewing position (FIGURE 5).

By the nature of the folding it will be apparent that the front panel may be swung upward and rearward to collapse the viewer and on release the rubber band will pull the viewer to an erect position with the brace limiting the motion at the viewing position.

The front panel is provided with a pair of apertures 38 in which the lenses 22 are mounted. The lenses are made from an inexpensive plastic and are provided with a flange 40 that will seat against the internal surface of the front wall. The lenses are locked in the aperture by inserting tab 42 in notch 44 and rotating the lens until the opposite tab is aligned in the notch. The lens is then turned a quarter turn so that the tabs are on the outside of the panel and hold the flange flush against the inside of the front panel.

A stereoscopic view of a slide requires accurate lateral and vertical spacing of the pictures in the mount. To achieve these critical conditions a pair of rectangular holes 48 are provided in rear wall 24 and a larger pair of rectangular holes 50 are provided in back panel 26. The rear wall 24 is folded against and secured to back panel 26 by an adhesive 52 so that the holes 48 are aligned with holes 50. The holes 50 act as a jig for the slides holding the slides in alignment with holes 48.

A translucent panel 54 is positioned in hole 50 and seats against rear wall 24 around the hole 48. The transparency 53 is then positioned in the hole 50 against strip 54 and is secured therein by an upper and lower adhesive strip of tape 56. The thickness of the cardboard is preferably equal to the combined thickness of the panel and transparency.

In the modified form of viewer shown in FIGURES 7, 8, and 9, a die cut blank 60 having a single slide mount portion 62, a top panel 64, a front panel 66, a bottom panel 68, and a diagonal brace portion 70 extending from the intersection of the slide mount portion and the bottom panel to the intersection of the top edge of the front panel. The diagonal is suitably apertured to allow viewing through lens 72 mounted in the front panel to obtain a proper view of a slide positioned in the mount. The blank is scored for folding as shown in FIGURE 7 wherein back panel 76 is folded back against a rear wall 74 and secured thereto by an adhesive 78 to provide a slide pocket therebetween. The rear wall 74 extends beyond the back panel and provides advertising space 79. The top panel is folded to a plane transverse to the back panel. The front panel folds down from the top panel parallel to the back panel and the bottom panel is folded parallel to the top panel. A tab 80 integral with the bottom panel is secured to the rear panel 74 by adhesive 82. The diagonal brace is folded from the intersection of the rear and bottom panels to the fold between the top and front panels. This brace is also made with a double thickness by folding on itself and providing a self adhesive to hold it together. An aperture 84 is cut in the brace to provide an unobstructed view along the viewing axis.

A rubber band 86 is positioned in notches 88 coplanar with the brace to bias the viewer to an upright position, FIGURE 8. As previously stated the front panel may be pushed upward and rearward to collapse the viewer and on release the rubber band will pull the viewer to an erect position. A single plastic lens 22 is mounted in an aperture 92 in the front panel and is provided with a flange 40 to seat on the inside of the front panel and tabs 42 are positioned on the front of the front panel through notch 98.

Slides (in the usual cardboard "ready-mount") are inserted into the slide mount through slot 100 provided in the top panel and are held by flaps 102 on the back panel against rear wall 74. A picture size rectangular aperture 104 is provided in the rear wall in alignment with the slide to allow light to reach the picture. A translucent strip can be inserted behind the slide if desired.

Although but two embodiments of the present invention has been illustrated and described, it will be apparent to those skilled in the art that various changes and modifications may be made therein without departing from the spirit of the invention or from the scope of the appended claims.

We claim:

1. A self-erecting viewer comprising back, top, front and bottom panels integrally connected to form a rectangular tube, means in the back panel for holding a transparency, said means including a wall hinged to the back panel and foldable thereagainst to form a pocket for the transparency, means in the front panel for holding a lens, a rubber band connected to a rear corner and to a diametrically opposed front corner to hold the panels in a rectangular relation, said front being collapsible against the back and said band being elongated when the viewer is collapsed so that the viewer will open upon release due to the bias of the band on the rectangular tube and brace means integral with the bottom panel to hold the viewer in the viewing position, said brace means including openings to provide an unobstructed view through the viewer and a member which is used to secure the bottom to the back panel.

2. A self-erecting viewer comprising a single blank of paperboard, one end of the blank being folded to form a pocket to hold a transparency and also forming the back of the viewer, the opposite end of the blank forming a diagonal brace for the viewer and being apertured to provide an unobstructed view through the viewer, a top panel, a front panel, and a bottom panel integrally connecting the two ends, the back, top, front and bottom panel being folded to form a rectangular tube, means cut from said opposite end for securing said opposite end to said one end, a lens mounted in the front, a rubber band longitudinally wound around the outside of the box generally parallel to the brace to bias the tube to a rectangular position and said tube being collapsible to a flat position whereby the tension in the band increases so that upon release the tube will open to the rectangular position.

3. A self-erecting viewer fabricated from a single blank of sheet material comprising a blank scored to provide back, top, front and bottom panels, a wall integral with the back panel and scored to fold against the back panel, an adhesive strip provided on both edges of the wall so that the wall adheres to the back panel and the wall and back panel form a pocket therebetween, a diagonal brace integral with the bottom panel and scored to fold to an acute angle with respect to the bottom panel, said brace being apertured to provide an unobstructed view through the viewer, a plastic lens mounted in the front panel, said blank being folded to form a rectangular open ended tube, said diagonal brace engaging the fold between the top and front panels, a rubber band providing a bias to an open position and including means for securing the bottom panel to the back panel, said tube being collapsible against the wall whereby the bias of the rubber band is increased so that upon release the box is moved to an open position.

4. A self-erecting viewer formed from a single blank of foldable material comprising a rear panel having openings therein, a wall hinged to the rear panel and having openings coinciding with the openings in the rear panel, said wall folding against the rear panel and being attached thereto to form a pocket between the rear panel and wall to hold transparencies therein, a slot in the hinge between the wall and rear panel, a top hingedly connected to the rear panel, a front panel apertured to hold a pair of lenses and being hingedly attached to the top panel, a bottom panel connected to the front panel, a diagonal member connected to the bottom panel and having openings therein, an extension hinged to the diagonal member and being folded back on the diagonal member, the diagonal member being integral with the bottom panel and operatively engaging the top edge of the front panel, a flap cut from the diagonal member and being integral with the bottom panel, said flap slidably engaging the slot to connect the bottom panel to the back panel, a rubber band secured to the viewer and providing a bias to an open position, the front panel and bottom panel being collapsible against the top panel and rear panel whereby the bias provided by the rubber band is increased so that the viewer will move to the open position if not retained in the collapsed position.

5. A viewer according to claim 4 in which the openings in the rear panel are sized to receive the standard stereo transparencies and to space the transparencies for stereo effect, the openings in the wall being smaller than the rear panel openings and generally coinciding with the picture area on the transparency.

References Cited in the file of this patent

UNITED STATES PATENTS

| | | |
|---|---|---|
| 2,768,554 | Leslie | Oct. 30, 1956 |
| 2,789,460 | Kaufman | Apr. 23, 1957 |
| 2,794,367 | Turner | June 4, 1957 |
| 2,809,452 | Brown | Oct. 15, 1957 |